Feb. 7, 1961  E. W. TANGARD  2,970,684
MAIL CONVEYING DEVICE
Filed Jan. 12, 1959  7 Sheets-Sheet 1
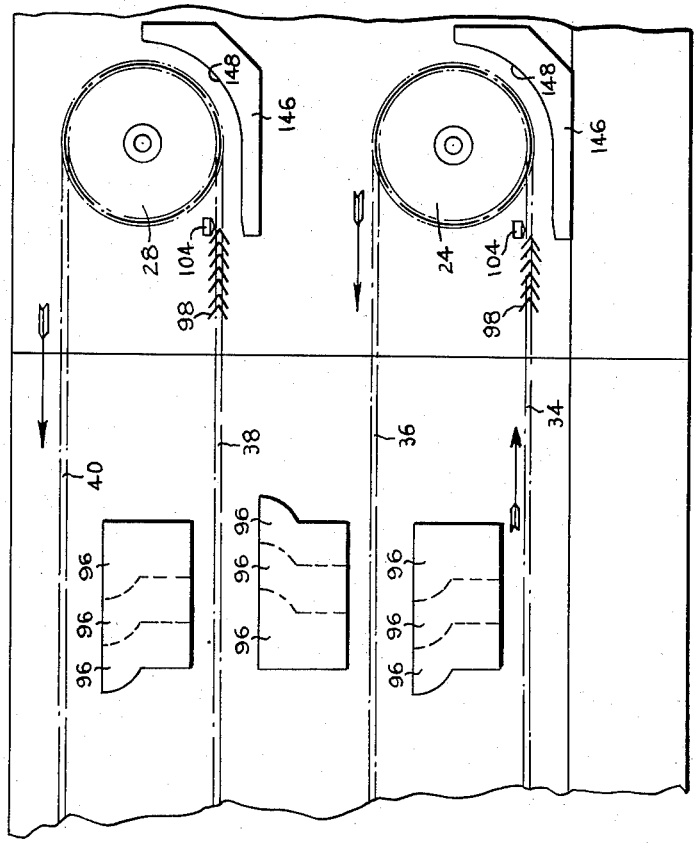
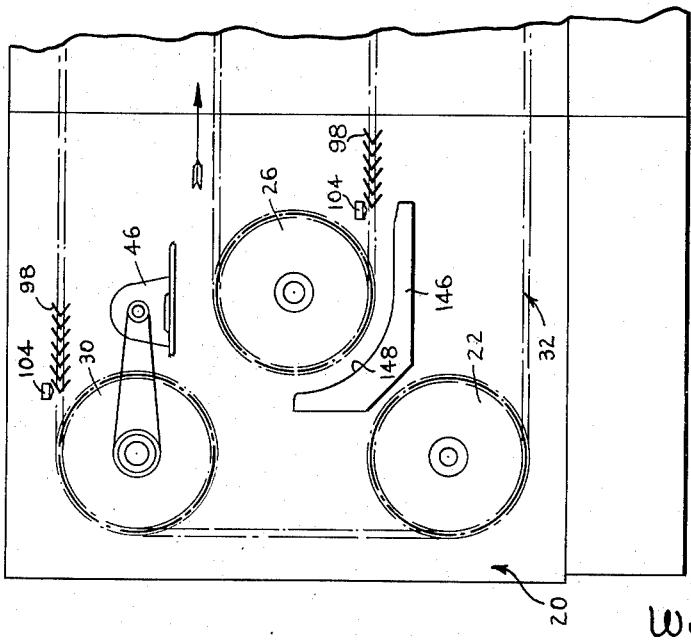
Fig. 1
INVENTOR
EINAR W. TANGARD
BY
William W. Jolterige
ATTORNEY

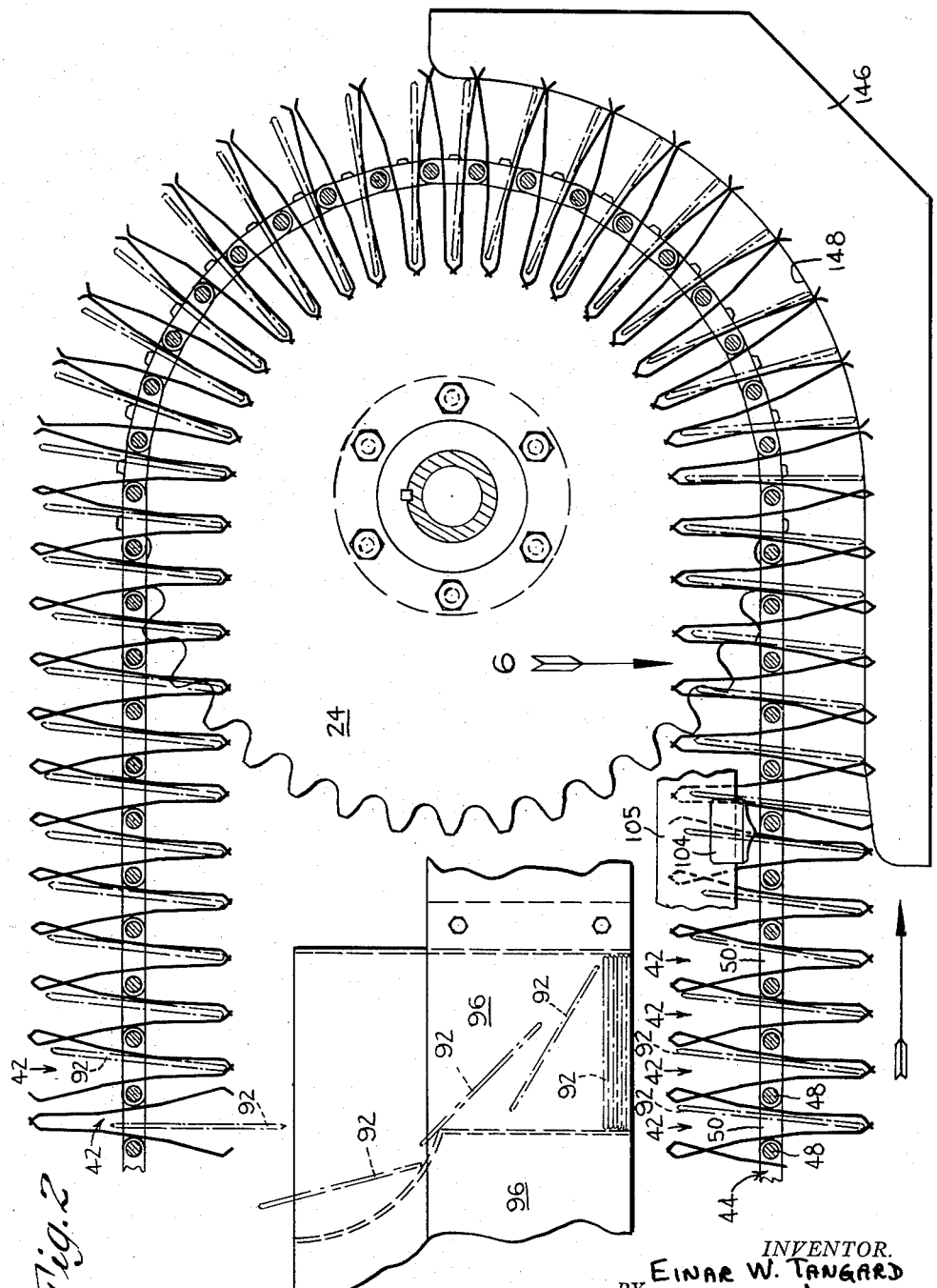

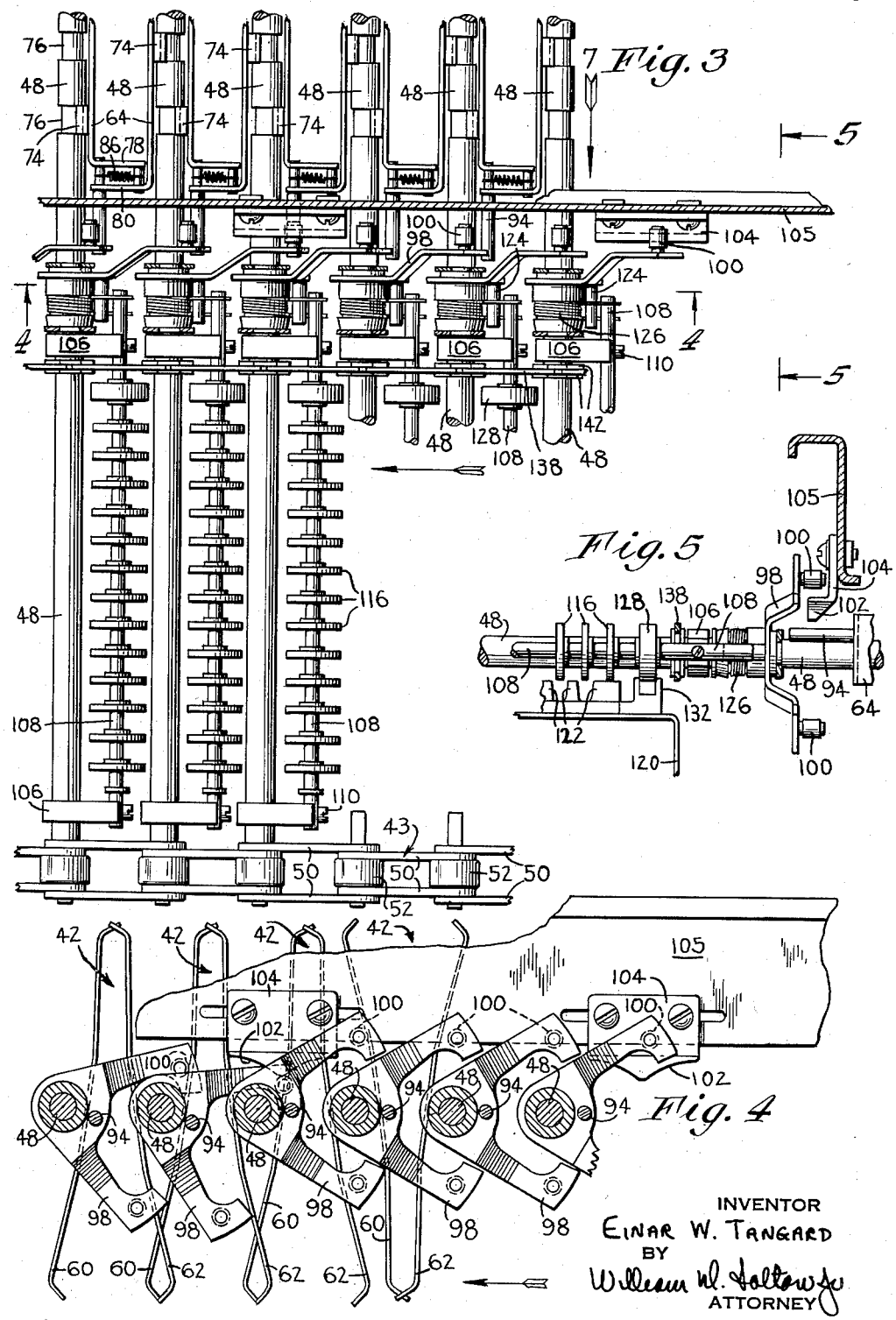

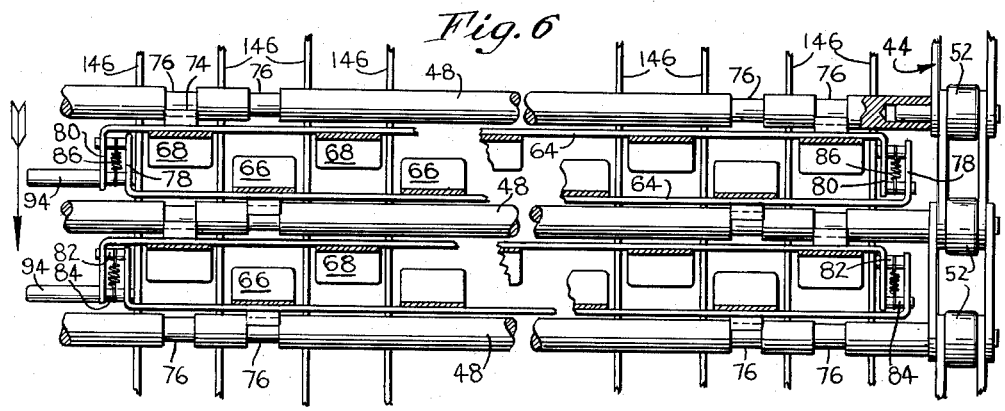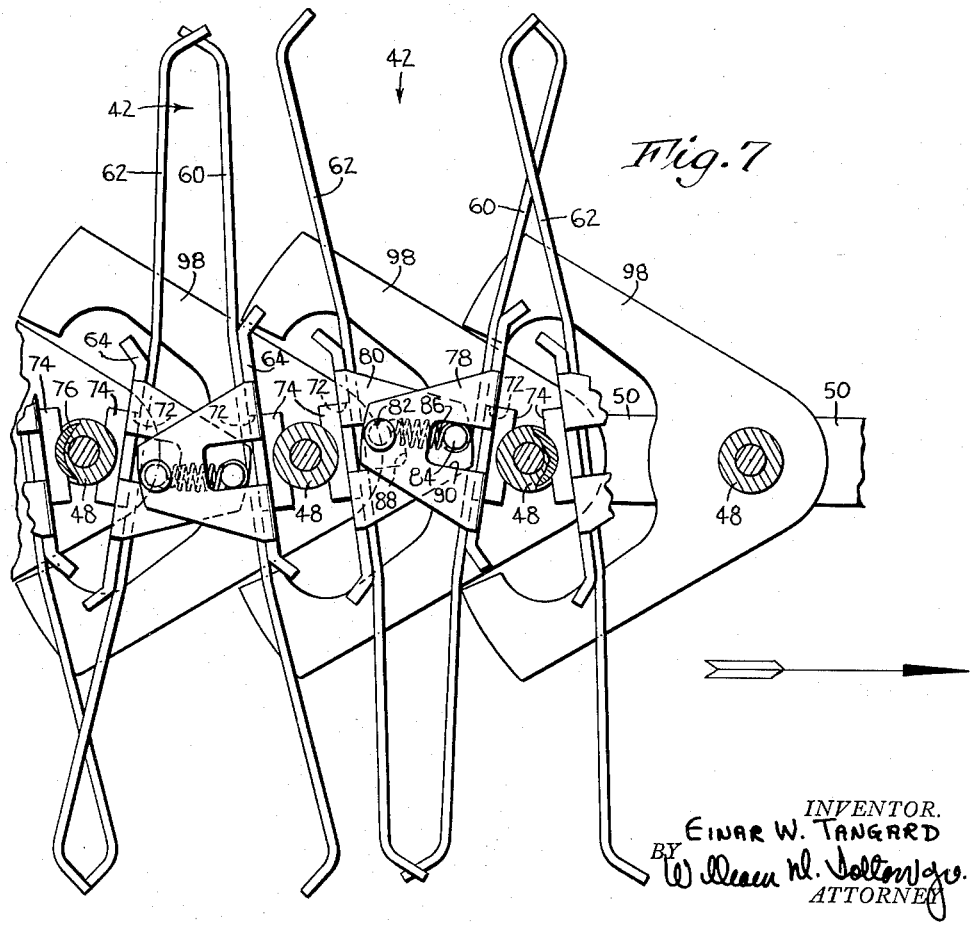

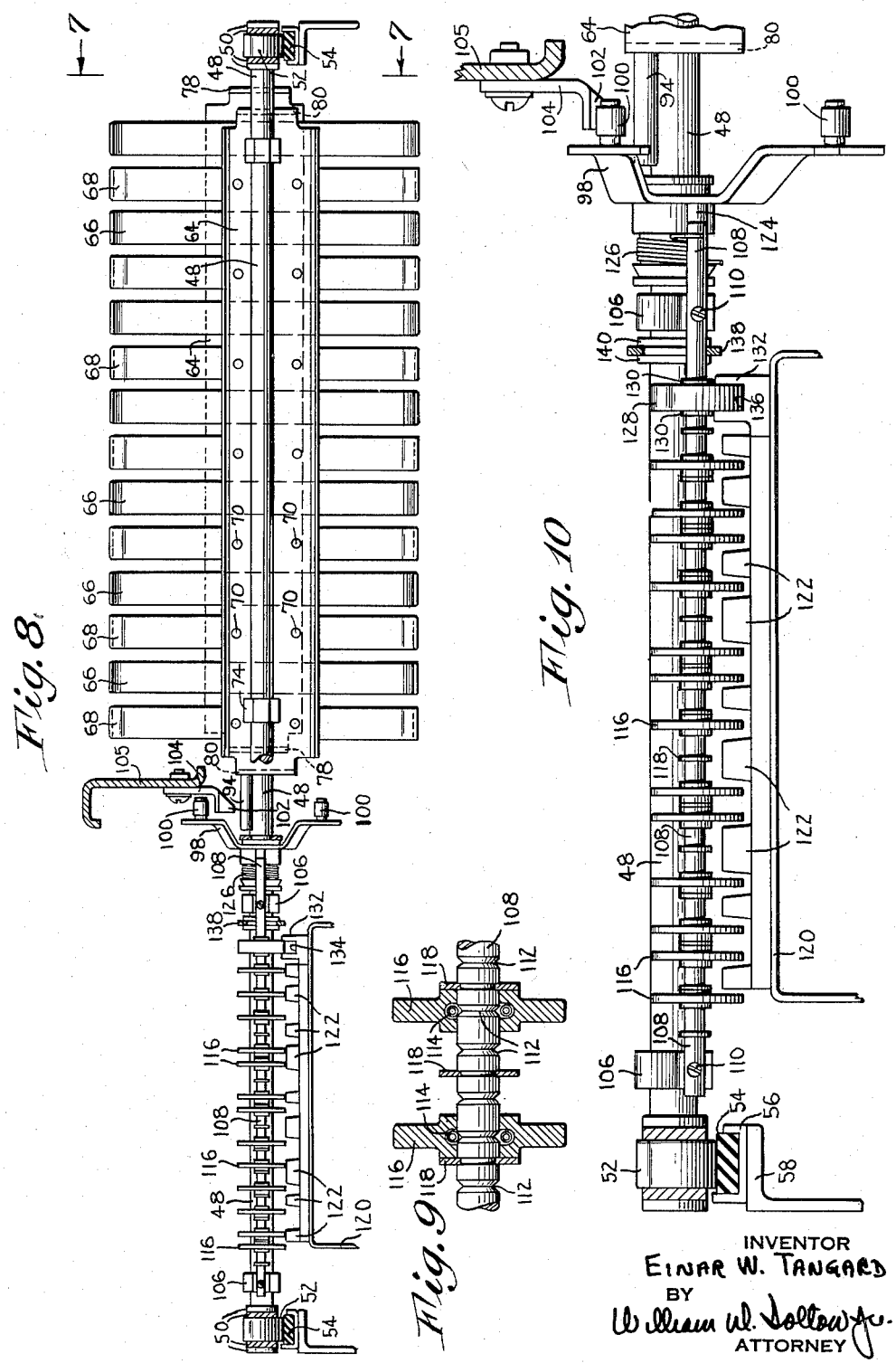

Feb. 7, 1961 E. W. TANGARD 2,970,684
MAIL CONVEYING DEVICE
Filed Jan. 12, 1959 7 Sheets-Sheet 6
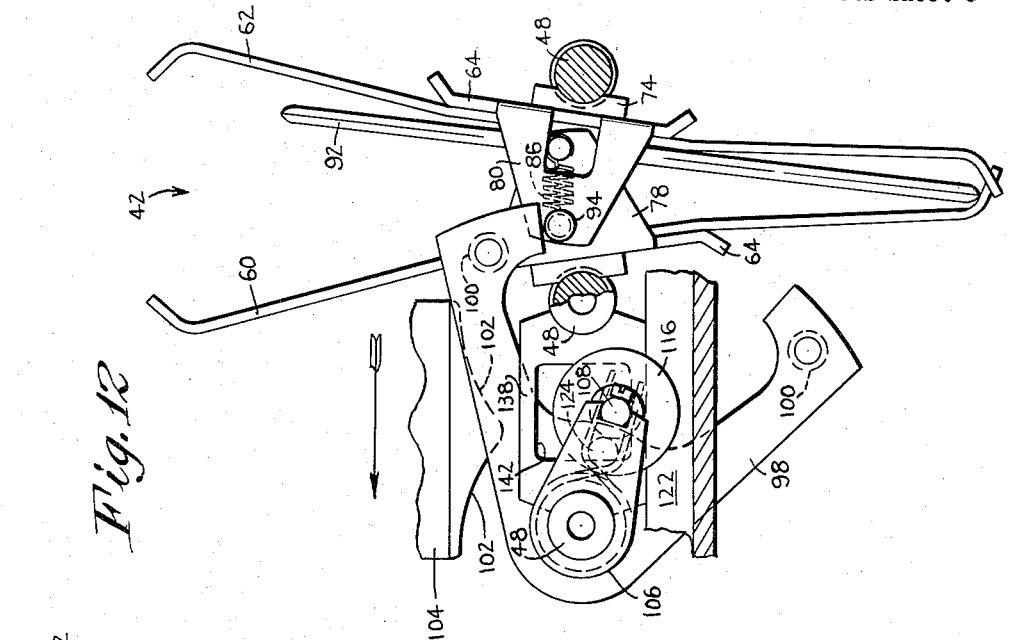
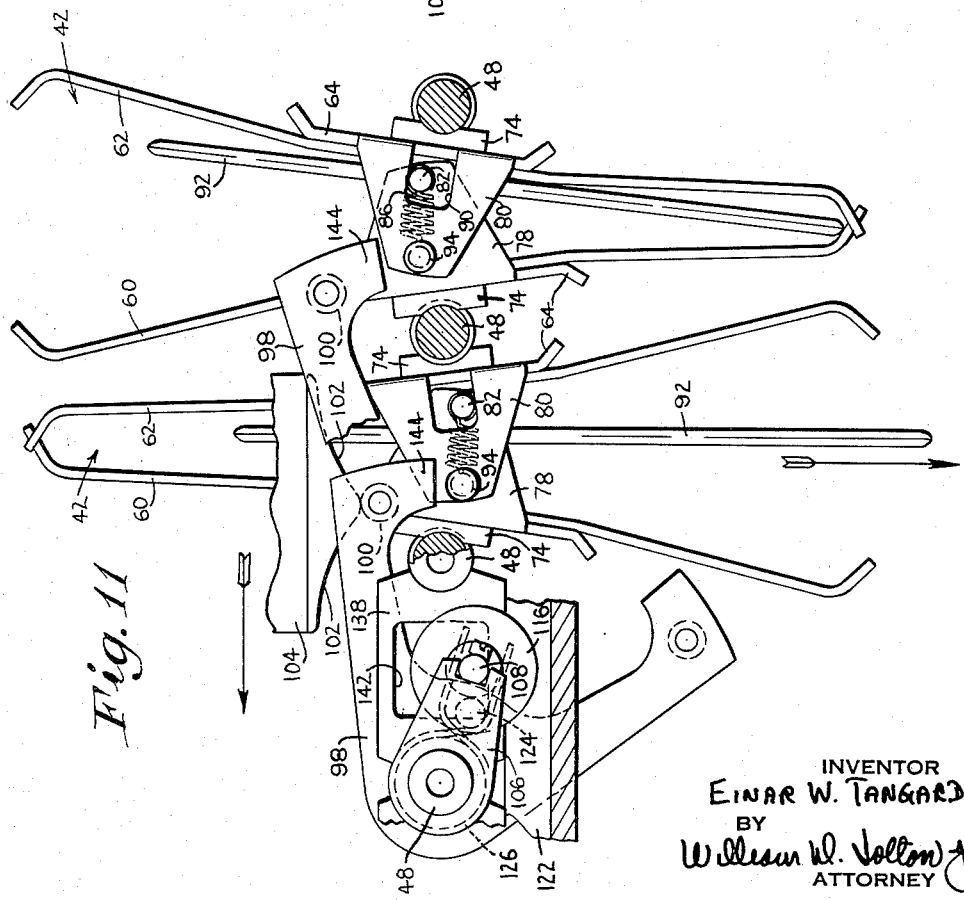
INVENTOR
EINAR W. TANGARD
BY
William W. Jolton jr.
ATTORNEY Feb. 7, 1961 E. W. TANGARD 2,970,684
MAIL CONVEYING DEVICE
Filed Jan. 12, 1959 7 Sheets—Sheet 7

INVENTOR
EINAR W. TANGARD
BY
William W. Holton Jr.
ATTORNEY

United States Patent Office 2,970,684
Patented Feb. 7, 1961

2,970,684

MAIL CONVEYING DEVICE

Einar W. Tangard, Norwalk, Conn., assignor to Pitney-Bowes, Inc., Stamford, Conn., a corporation of Delaware Filed Jan. 12, 1959, Ser. No. 786,134

16 Claims. (Cl. 198—131)

This invention relates to an article handling apparatus, and more particularly, to such an apparatus which is effective to receive, convey and discharge articles handled thereby. This invention constitutes an improvement over that set forth in U.S. application Serial No. 644,017 filed March 5, 1957 by J. Rabinow et al., now Patent No. 2,901,089.

An object of this invention is the provision of such an apparatus which is capable of more rapid operation, more regular as opposed to discontinuous or irregular operation and more dependable operation; which is capable of handling a greater number of articles per unit time and/or per unit speed of conveying; and which is comparatively inexpensive to manufacture.

A further object of this invention is to provide such an apparatus which includes a plurality of successive pockets arranged along a conveyor having a plurality of horizontal reaches, each of said pockets being individually inverted in passing from one horizontal reach to the next whereby movement of a continuous, uninterrupted succession of said pockets in operation of the apparatus can be provided for. Another object is to provide such an apparatus which includes novel means for retaining the contents of each of said pockets therein as the latter are being inverted.

Another object of the invention is the provision of such an apparatus including a plurality of pockets which are reversible first to receive and carry articles and then to discharge said articles.

A further object of this invention is the provision of a novel apparatus capable of conveying articles for selective discharge at respective ones of a plurality of different locations thereby to sort said articles. An additional object of the present invention is the provision of such a novel apparatus which lends itself well to the provision of a relatively large number of such different locations.

Still another object of the invention is the provision of such an apparatus including a conveyor carrying a plurality of article receiving, conveying and discharging pockets which are readily removable from and/or replaceable on their respective mounting means.

Other objects and advantages will become apparent as the description proceeds.

In the accompanying drawings:

Fig. 1 is a schematic elevational view of a portion of an apparatus embodying the invention;

Fig. 2 is a fragmentary elevational view showing a portion of the apparatus with parts in section, the successively arranged pockets being shown schematically for clarity of illustration;

Fig. 3 is a fragmentary plan view, partly in section, of a portion of the conveying means and code wheel means associated therewith;

Figure 13:
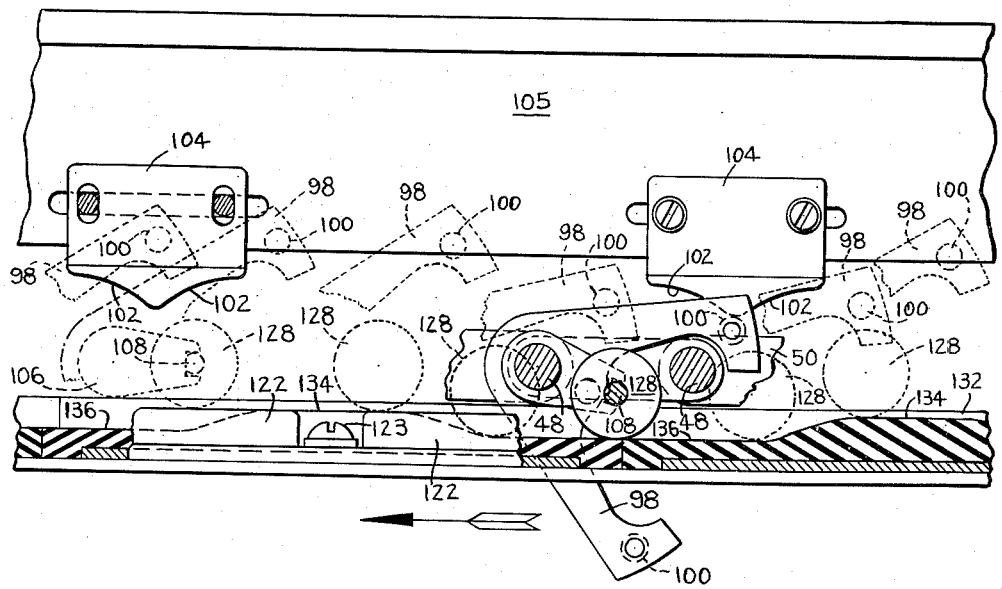

Figs. 4 and 5 are sectional views taken along lines 4—4 and 5—5 respectively, in Fig. 3;

Fig. 6 is a fragmentary plan view taken in the direction of arrow 6 in Fig. 2;

Fig. 7 is a fragmentary elevational view taken in the direction of the arrow 7 on Fig. 3, this view being on an enlarged scale and showing several of the pockets of the conveyor along with respective cam-follower members which effect adjustment of the pockets from a closed to an open position;

Fig. 8 is an elevational view showing one of the successively arranged main shafts of the conveyor and the parts carried thereby along with a portion of the succeeding main shaft and the parts carried thereby, this view being taken from the right-hand side of the apparatus as shown in Figs. 1 and 2 and these main shafts being located on a horizontal reach of the conveyor such that they are movable in the direction away from the viewer;

Fig. 9 is a fragmentary view partly in section and on a scale enlarged over that of Fig. 8 of a portion of a main shaft upon which are disposed two code wheels;

Fig. 10 is a fragmentary view of a portion of the code wheel structure as shown in Fig. 8 but on a scale intermediate those of Figs. 8 and 9 and showing the code wheels in a lowered or setting position relative to the coincidence members associated therewith;

Figs. 11 and 12 are fragmentary views on approximately the same scale as that of Fig. 7 but in the direction from the front of the apparatus as viewed in Figs. 1 and 2, Fig. 11 showing a cam-follower member and associated pocket just after opening of the latter and a portion of a succeeding cam-follower member and associated pocket after setting of the latter prior to opening thereof, and Fig. 12 showing a cam-follower member and associated pocket just prior to opening of the latter by the former; and Fig. 13 is a fragmentary view partly in section showing successive positions of a pocket-reversing cam-follower member and the corresponding successive positions of an associated master cam follower roller along a master cam track.

Referring to Fig. 1 of the drawing, the illustrated embodiment of the invention includes a frame generally designated by the reference numeral 20. Supported by frame 20 are a plurality of pairs of aligned sprocket wheels 22, 24, 26, 28 and 30, respectively, each pair of sprocket wheels being keyed to a common shaft. An endless conveyor generally designated at 32 is trained about said pairs of sprocket wheels to provide a plurality of horizontal conveyor reaches or runs 34, 36, 38 and 40; it being noted that each section of the endless conveyor is inverted in passing from one reach to the next. Successively arranged along the conveyor are a plurality of pockets generally indicated at 42 (see Fig. 2 for example) adapted to receive, convey and discharge articles such as letter mail, bills, invoices, etc., all as will hereinafter be more particularly described.

Conveyor 32 includes a pair of laterally spaced endless linkage members 43 and 44 in the form of sprocket chains each trained about and meshing with one of the sprocket wheels of each of said pairs. Linkage members 43 and 44 are continuously driven in the path indicated by the respective arrows in Fig. 1 by means such as a motor 46 connected to drive pair of sprocket wheels 30. Conveyor 32 further includes a plurality of main shafts 48 successively arranged therealong, the opposite ends of each of the shafts 48 pivotally connecting the successive pairs of links 50 of each of the sprocket chains and carrying a roller 52. Each of the rollers 52 rides on a track 54 along each of the horizontal reaches of the conveyor. Each of the tracks 54 terminates adjacent the respective sprocket wheels, is provided by a length of noise-dampening material such as rubber, and is carried by a channel member 56 mounted on a frame member 58 (see Fig. 10).

With reference to Figs. 6, 7, 8, 11 and 12, each of the pockets 42 comprises a pair of opposing members 60 and 62, respectively. Each of the pocket members 60 and 62 includes a laterally extending plate 64 which mounts a plurality of laterally spaced, vertically extending elements or fingers 66 by means such as rivets 70. The fingers of the leading pocket member 60 of each pair (in the path of movement of the conveyor) are alternated laterally with and laterally spaced from the fingers 68 of the trailing pocket member of each pair, as best seen in Figs. 6 and 8. Each of said plates 64 provides a pair of laterally spaced recesses 72 (see Fig. 7) within each of which is interfitted a bearing block 74, each of the latter being disposed against one of the main shafts 48. As shown in Fig. 6, each of the shafts 48 provides two pairs of reduced diameter portions 76, two of the latter having a bearing block 74 of a leading pocket member 60 disposed thereagainst and the other two having a bearing block 74 of the trailing pocket member 62 similarly disposed therein. By this arrangement, lateral shifting of the pocket members 60 and 62 along each main shaft 48 is effectively prevented. Each of the pocket members 60 and 62 carries an angular extension 78 and 80, respectively, at each side thereof. Each angular extension 78 and 80 carries a pin 82 and 84, respectively; each pair of mutually adjacent pins having one end of a tension spring 86 connected thereto. Each spring 86 yieldingly urges the respective pair of pins 82, 84 toward each other thereby yieldingly urging each pocket member toward the shaft on which it is mounted. In this manner, each bearing block 74 is biased by its respective pocket member against the respective main shaft on which it is mounted and is retained within the recess 72 provided by its respective pocket member. As best seen in Figs. 7 and 8, each of the pins 82 laterally extends through an aperture 88 in an adjacent angular extension 80 and each of the pins 84 laterally extends through an aperture 90 in extension 78. Each of the pocket members 60 and 62 is mounted on the respective main shaft 48 by which it is carried for movement between two pivotal positions of stability relative to each other. In one of these pivotal positions of stability (which will be referred to herein as the closed position) the opposing pocket members of each pair are spaced away from each other adjacent their upper ends and intersect along a laterally extending line adjacent their lower ends. When in the closed position, the opposing members 60 and 62 of each pair are as shown in Fig. 12, in which position the pocket 42 formed thereby is adapted to receive and convey an article such as a piece of letter mail 92. The pocket members 60 and 62 of each of said pairs along said horizontal reaches intersect along a laterally extending line adjacent their upper ends and are spaced away from each other adjacent their lower ends when moved to (what will be referred to herein as the open position.

Referring to Fig. 11, the right-hand pocket 42 is shown in closed position with a letter 92 carried therein and the left-hand pocket 42 is shown as having just been opened to discharge a letter 92 therefrom. As best shown in Fig. 7, the upper and lower edges which define apertures 88 and 90 within the extensions 78 and 80, respectively, are engageable with pins 82 and 84 to limit the extent of pivotal movement of the respective opposing pocket members. With this construction, it will be apparent that each of the springs 86, in combination with each pair of pins 82 and 84 to which each spring is connected, comprises a yieldable over-center means for alternatively urging the opposing members 60 and 62 of each pair to one of the previously described pivotal positions of stability.

By means later to be described, each of the pockets 42 is adapted to be reversed from the closed pivotal position of stability to the open position of stability. In this regard, one of the angular extensions 80 carries a pin 94. See Figs. 11 and 12. When the pin 94 of a pocket 42 in the open position is depressed past an over-center point the opposing members 60, 62 thereof are quickly reversed to the open position.

Each of the successively arranged pockets 42 when loaded with an article 92, such as a piece of letter mail, is in closed position, and means are provided for moving the opposing members 60, 62 of the pockets to open position selectively to discharge said articles at respective ones of a plurality of locations thereby to sort the articles. At each of these locations a receiver 96 (Fig. 1) is provided into which respective articles are deposited upon being discharged from respective pockets.

For the purpose of opening the pockets, each of the latter has associated therewith a substantially V-shaped, pocket-opening, cam-follower member 98 mounted for pivotal movement on the main shaft 48 next preceding the one on which the leading opposing member 60 of that pocket is mounted. A cam-follower roller 100 is rotatably carried adjacent the distal end of each leg of each of the V-shaped members 98, each of the then uppermost rollers 100 normally moving along each of the horizontal reaches of conveyor 32 at a level above the cam surface 102 of each of a plurality of horizontally aligned cam members 104. Each of the cam members 104 is adjustably carried by a longitudinal frame member 105, as best shown in Fig. 13. Means now to be described are provided for setting the then uppermost rollers 100 to a level for engagement with respective cam surfaces 102, this being accomplished by correspondingly pivoting the respective cam-follower member 98 about its respective main shaft 48. Referring to Figs. 4, 5 and 8–10, each of main shafts 48 mounts for lateral and pivotal movement thereon a pair of laterally spaced brackets 106 which have an auxiliary shaft 108 secured thereto as by means of screws 110. As shown best in Fig. 9, each of the shafts 108 is provided with a plurality of laterally spaced grooves 112 within selected ones of which code wheels 116 are releasably retained by annular coil springs 114, the code wheels being adapted to rotate about the shaft. Each code wheel 116, of a plurality thereof on each of shafts 108, is releasably settable in either one of a pair of grooves 112 thereby to provide for coding said shaft for ultimately opening the pocket 42 associated therewith. To prevent over-travel of the code wheels when being shifted from one groove 112 to the other of a respective pair, successive spring clips 118 are provided which interfit with additional grooves in shafts 108 and which are engageable with the relatively adjacent code wheels.

Referring to Figs. 8 and 10, frame 20 includes a frame member 120 supporting a plurality of transversely, alternately settable coincidence members 122 at each of a plurality of locations corresponding to the locations of receivers 96 along each of horizontal conveyor reaches 36, 38 and 40. The coincidence members may be retained in place by means of a screw 123 as shown in Fig. 13, or alternatively may take the form of track sections 30 as described in the aforementioned Rabinow patent. When the transverse setting of all of the coincidence members 122 at a given location is such that any one or more thereof is aligned with a code wheel 116 carried by an auxiliary shaft 108 thereabove, the latter is prevented from pivoting downwardly about the axis of the main shaft 48 upon which it is carried. This situation is depicted in Fig. 8 wherein the first, second, fourth, fifth, sixth, ninth and twelfth code wheels 116 from the right coincide with and engage a coincidence member 122. It will be understood that such a coincidence of any single one of these seven coinciding code wheels as in Fig. 8 would be sufficient to prevent this downward pivoting of auxiliary shaft 108. When coincidence members 122 are arranged at one location so that all of the code wheels of an auxiliary shaft 108 thereabove are misaligned therewith, that auxiliary shaft, under its own weight and that of the code wheels 116 carried thereby, etc., will pivot downwardly to the position shown in Fig. 10. By virtue of a connection between each of auxiliary shafts 108 and one of the pocket-opening, cam follower members 98 as now to be described, this downward pivoting of an auxiliary shaft effects the pivotal setting of an associated cam follower member 98 to bring the then uppermost roller 100 carried thereby to a level for engagement with a respective cam surface 102.

As best seen in Figs. 3 and 11, each of the auxiliary shafts 108 extends laterally of the conveyor into overlapping relation with a pin 124 carried by one of the cam-follower members 98. The two ends of a torsion spring 126 carried about each main shaft 48 straddle an auxiliary shaft 108 and pin 124 where the two overlap thereby connecting the two for pivotal movement with each other and providing for lost motion relative to shaft 108 of pin 124 and the cam follower 98 carrying that pin, this lost motion being against the bias of torsion spring 126. This lost motion occurs during depression of cam follower 98 and the then uppermost roller 100 carried thereby during engagement by the latter with a cam surface 102 provided by a cam member 104, all as will later be more particularly described.

Each of the auxiliary shafts 108 also rotatably carries a cam follower roller 128 laterally fixed thereon by means of spring clips 130. Cam follower rollers 128 ride along a channel-shaped cam track 132, one of the latter extending along each of horizontal reaches 36, 38 and 40. The side walls of each of the cam tracks 132 laterally guide and thereby maintain lateral alignment of each of rollers 128. In this manner, lateral alignment of the code wheels 116 on each auxiliary shaft 108 is maintained. To aid in distinguishing cams 104 and cam follower rollers 100 from cams 132 and cam follower rollers 128, the latter will be referred to hereinafter in this description as "master" cams and "master" cam follower rollers. Each of the master cam tracks 132 may be formed of rubber or the like and includes two successively alternate cam dwell surfaces 134 and 136 (see particularly Fig. 13). Upper master cam dwell surfaces 134 retain each V-shaped cam follower member 98 in the upper or neutral pivotal position, shown in broken lines at the extreme right-hand side of Fig. 13, when a respective master cam follower roller 128 is riding thereon, and lower master cam dwell surfaces 136 permit each V-shaped cam follower member 98 to pivot downwardly to the next succeeding broken-line position shown in Fig. 13 when a respective master cam follower roller 128 is moving therealong.

Unless all of the code wheels 116 along a given auxiliary shaft 108 are misaligned with their respective coincidence members 122 at a respective location along one of horizontal conveyor reaches 36, 38 and 40 as is depicted in Fig. 8, the engagement of at least one of these code wheels with a coincidence member will prevent the auxiliary shaft 108 from pivoting downwardly from the time the associated master cam roller 128 moves past an upper master cam dwell surface 134 until it again reaches the next succeeding upper cam dwell surface. When the situation is as depicted in Fig. 10, however, in which all of the code wheels 116 on an auxiliary shaft 108 are misaligned with the respective coincidence members 122 at that location, that auxiliary shaft 108 will be permitted by the code wheels and coincidence members to pivot downwardly as determined by the gradual letting down of master cam follower roller 128 as it moves along the gradually downwardly sloping surface portion of the master cam track surface which leads to lower cam dwell surface 136. When a master cam roller 128 reaches a lower master cam dwell surface 136, the then uppermost cam follower roller 100 will have dropped to the second broken-line position from the right as viewed in Fig. 13, at which position that roller 100 will be set for subsequent engagement with and depression by cam surface 102 of a cam 104. As master cam roller 128 rides on and along lower cam dwell surface 136, no further downward pivotal movement of auxiliary shaft 108 takes place and further downward pivotal movement of cam follower member 98 takes place under the influence of the cam 104 and against the bias of torsion spring 126. A cam follower member 98 and associated master cam follower roller 128 are shown in full lines in Fig. 13 at their respective positions with the former fully depressed. A comparison of the respective positions of the parts as shown in Figs. 11 and 12 clearly brings out the lost motion movement of pin 124 (as carried by cam follower member 98) relative to auxiliary shaft 108. When a cam follower member 98 is so depressed against the bias of a torsion spring 126, the then uppermost inturned end 144 thereof moves downwardly against a respective pin 94 carried by one of angular extensions 80 in turn to depress that pin 94. As previously described, when a pin 94 is so depressed past an over-center point, the opposing members 60, 62 of the associated pocket 42 are reversed from closed position to open position.

As a cam follower member 98 moves past the fully-depressed, full-line position as shown in Fig. 13 it retracts under the bias of torsion spring 126 to the level shown at the next succeeding broken-line position in this figure while the associated master cam follower roller 128 rides along a lower master cam dwell surface 136. The master cam follower roller 128 then rides along the gradually upwardly sloping surface portion of the master cam track to the next succeeding broken-line position shown in Fig. 13 thereby fully retracting the cam follower member 98. Portions of two coincidence members 122, 122 are included in Fig. 13, the one to the right as viewed in this figure being misaligned, as is each of the others at that location, with its respective code wheel 116. The portion of the coincidence member 122 to the left as viewed in Fig. 13 (or any one or more of the others at the same location) is not misaligned with its respective code wheel so that downward setting of the cam follower member 98 as would otherwise occur by virtue of master cam follower roller 128 riding along the next succeeding gradually downwardly sloping surface portion of the master cam track, does not, of course, occur. Rather, the one or more misaligned coincidence members 122 retain their respective code wheels in their upper retracted position in turn retaining the associated auxiliary shaft 108 and cam follower member 98 in their upper retracted position. The result is that, as shown by the last two succeeding broken-line positions of cam follower member 98 in Fig. 13, the then uppermost cam follower roller 100 thereon passes cam 104 above the level of its cam surface 102 and is not depressed thereby.

It will thus be apparent that while a cam 104 is provided for the location of each receiver 96 along each of horizontal conveyor reaches 36, 38 and 40, misalignment of all of the code wheels 116 of any given auxiliary shaft 108 with the coincidence members 122 at ordinarily only one of these locations occurs so that only the cam 104 for that particular location will be effective to cause opening of the associated pocket 42 for discharge of its contents. Such discharge of a letter 92 from its pocket 42 is depicted at the end of the portion of the uppermost reach shown in Fig. 2. The speed of the conveyor may be sufficiently great that the momentum of the released letter 92 will carry it forward while it drops as indicated by the successive broken-line positions of a letter 92 as depicted in Fig. 2.

While each auxiliary shaft 108 is located along any one of the several horizontal reaches 34, 36, 38 and 40, pivotal movement of that auxiliary shaft about the main shaft 48 on which it is mounted is controlled by the coincidence members 122 and track on which ride the associated code wheels 116 and master cam follower roller 128, respectively. However, these tracks and coincidence members do not extend about the pairs of sprocket wheels 24, 26, 28, 30, 22 nor between the latter two pairs of sprocket wheels according to the embodiment particularly described herein. Auxiliary means is therefore provided to prevent excessive pivotal movement of each auxiliary shaft 108 about its main shaft 48. This auxiliary means comprises a movement-limiting element 138 for each auxiliary shaft, each of these elements 138 being confined between and having its opposite ends interfitted against two succeeding main shafts 48 (see Figs. 3, 5, 8, 10 and particularly Figs. 11 and 12). Spring clips 140 at each side of the movement-limiting elements 138 retain the latter against lateral shifting while permitting pivotal movement about the main shafts 48. Each element 138 has an aperture 142 through which one of the auxiliary shafts 108 extends. Each auxiliary shaft is therefore confined within the aperture 142 of its associated movement-limiting element 138, and by this means the auxiliary shafts are prevented from excessive pivotal movement about their respective main shafts 48 while moving around sprocket wheels 22, 24, 26, 28 and 30 and while moving from sprocket wheels 30 to sprocket wheels 22.

According to the particular embodiment of the present invention as shown in the drawings, lowermost horizontal reach 34 of the conveyor is utilized for loading the successively arranged pockets 42 as they move therealong and for setting the associated code wheels 116 so as to be misaligned with the coincidence members 122 for the locations at which the respective articles are to be discharged. For details of one form of means for so setting the code wheels 116, reference may be had to the above-mentioned patent to Rabinow. A track is provided for horizontal reach 34 which is identically oriented and otherwise identical as compared with the above-described master cam track 132 as provided for each of the horizontal reaches 36, 38 and 40, except that the surface thereof, on which master cam follower roller 128 rides, extends on a constant level and preferably at a relative height corresponding to that of upper master cam dwell surface 136 of the master cam track for each of the conveyor reaches 36, 38 and 40. This is the case, of course, because the entire length of reach 34 is utilized for loading of the pockets 42 as they move therealong and the pockets must be kept closed so as to retain their contents after being loaded. It will be apparent that the illustrated embodiment is fully susceptible of modification whereby a portion of conveyor reach 34 is utilized for discharging articles from the pockets, and, in fact, if desired for some reason, any portion of or one or more of the horizontal reaches 36, 38 and 40 could be utilized for loading the pockets to the exclusion of or in addition to the whole or any portion of horizontal reach 34.

As previously noted, the successive sections of the endless conveyor along with the succeeding pockets 42 carried thereby are inverted by a respective pair of sprocket wheels in passing from one horizontal reach to the next. Means are provided for closing the open end of each of the loaded pockets and for retaining its contents therein while passing from each of horizontal reaches 34, 36 and 38 to the next succeeding reach. In this regard, an additional cam 104 is carried by frame members 105 adjacent the end of each of the horizontal conveyor reaches shortly prior to inverting of the successive pockets for reversing the position of the opposing members 60, 62 thereof. It will be clear that the track along which each of the master cam follower rollers rides either terminates or extends along the relative level of lower master cam dwell surfaces 136 at a corresponding point so that each cam follower member 98 will be pivotally set to bring its then uppermost cam follower roller 100 into engagement with the cam surface 102 thereof for depression thereby so that each of the succeeding pockets 42 will be opened. A plurality of retaining members 146 are provided as shown in Figs. 2 and 6 for preventing the contents of any loaded pocket from dropping out. Retaining members 146 are laterally spaced from each other and extend into the lateral space between elements 66 and 68 of opposing members 60 and 62, respectively, as the successive pockets move therepast, all as shown in Figs. 2 and 6. Each of retaining members 146 presents a surface 148 engageable with the articles carried by pockets 42 from the time the latter are opened until they no longer have their open ends lowermost. Inversion of the successive pockets 42 in moving from horizontal reach 34 to reach 36 is depicted in Fig. 2, it being understood that cam 104 and retaining plates 146, as shown in this figure, would be identical with their counterparts between reaches 38 and 40 and would be mirror-images of their counterparts between reaches 36 and 38. It will be noted that each pocket 42, as it moves past each pair of sprocket wheels 24, 26 and 28 at which it is inverted, will then be in closed position regardless of whether or not it is loaded.

Ordinarily at least, each of the pockets 42 will have discharged its contents while moving along one of the reaches 36, 38 and 40 and prior to movement thereof past the end of uppermost reach 40. By the time each pocket moves to the end of reach 40, it will be in either open or closed position; open if its contents had been discharged along reach 40 and closed if not. Means is provided at the end of the uppermost reach 40 for opening every closed pocket that moves therepast. In this regard, the end of master cam track 132 for conveyor reach 40 and a cam 104 are provided of the same form and at the same relative location as their counterparts at the end of each of reaches 34, 36 and 38. The contents of all of the pockets having been discharged, however, there is no need for the provision of retaining members 146 at the end of reach 40. Just as is the case at the end of each of the reaches 34, 36 and 38, the succession of coincidence members 122 terminates short of the end of reach 40; the master cam track permits setting of the then uppermost cam follower for engagement with and depression by a terminal cam 104; and the latter effects opening of each closed pocket 42 at the end of reach 40 as the successive pockets move therepast. The result is that at the end of reach 40 all of the successive pockets will be in open position so that each of the pockets, being inverted while passing from the end of reach 40 to the beginning of reach 34, will be in closed position for the reception of an article while moving along reach 34. It will be clear that those pockets which are closed upon moving to the end of reach 40 could, as well, be reversed between pairs of sprocket wheels 30 and 22 or, alternatively, just after moving past sprocket wheels 22. This latter alternative would, of course, preempt a portion of reach 34 which could otherwise be utilized for loading of the pockets.

It is of interest to note that, according to the particular embodiment of the present invention as shown and described herein, none of the pockets are reversed from open to closed position by a cam 104 although they are fully capable of being so reversed; this change in position, in each case, being instead effected when it does occur by inversion of the respective pockets. This would not be the case, of course, if, for example, the position of every pocket which was closed upon reaching the end of reach 40 were to be reversed just after those pockets moved past pair of sprocket wheels 22 as noted above. With this latter arrangement, it will be obvious that the master cam track 132 for reach 34 would provide an initial cam dwell surface at a height above dwell surfaces 134 equal to that which the latter are above dwell surfaces 136 pivotally to elevate the then lowermost cam follower rollers 100 for engagement with and further elevation by a cam 104 disposed in inverted mirror-image relation to the other cams 104, thereby to reverse every pocket in open position to the closed position.

It will be noted that an extra code wheel 116 is carried adjacent the left-hand end of the auxiliary shaft 108 as viewed in each of Figs. 8 and 10, and for which no coincidence member 122 is provided. This expedient is utilized for effecting separation, for example, of air mail letters and regular mail letters between two successive receivers 96 for which the coincidence members are otherwise identically arranged. An auxiliary coincidence member would have to be provided for one of these two successive receivers 96 in this latter case, but this is not illustrated in the drawings because it forms no part of the present invention.

The progress of a single pocket 42 will now be described throughout a complete cycle of conveyor 32 to illustrate the overall operation of the disclosed embodiment. As this pocket moves along lowermost conveyor reach 34, it will be in closed position; it will receive a letter or similar article 92; and the code wheels 116 on the associated auxiliary shaft 108 will be coded by shifting one or more wheels thereof for discharge of the article into, let it be assumed, one of the receivers 96 along conveyor reach 38. As this pocket moves to the end of reach 34 it will be reversed to open position and the contents thereof will be retained therein by retaining members 146. The pocket will be inverted while moving around sprocket wheels 24 so as to be in closed position during its movement along horizontal reach 36. Inversion of the pocket and retention therein of its contents is effected in the same manner while it moves around sprocket wheels 26 at the end of reach 36. Of course, at least one of the coincidence members 122 at each of the respective locations along reach 36 will be aligned with a respective code wheel 116 so that no discharge of the contents of the pocket along this reach will occur. The pocket, as it moves in closed position along reach 38, will ultimately reach the location at which all of the code wheels 116 on the associated auxiliary shaft 108 will find misalignment with their respective coincidence members 122 so that the master cam roller 128 on that auxiliary shaft is permitted to ride from an upper cam dwell surface 134 down a gradually sloping master cam surface onto a lower master cam dwell surface 136. The result is that the then uppermost cam follower roller 100 of the associated cam follower member 98 will be set to the level for engagement with cam surface 102 of the cam 104 for that location. The latter cam 104 effects further lowering of the last-mentioned cam follower roller 100 to effect lost-motion movement of the respective cam follower member 98 relative to auxiliary shaft 108 and to move the inturned end of cam follower member 98 against pin extension 94 of the pocket, thereby to move the pin extension past the over-center point whereby the pocket is reversed to open position and its contents discharged into the receiver 96 for that location. The pocket continues to move in the open position to the end of reach 38 but will not be reversed by the cam 104 at the end of reach 38 since it had been previously opened along this reach. The pocket is inverted while moving about sprocket wheels 28 so that it will be in closed position while it moves along and to the end of uppermost conveyor reach 40. The pocket will then be reversed from closed to open position by the cam 104 at the end of conveyor reach 40 so that it will again be in closed position for movement along lowermost reach 34 after having been inverted while moving from the end of reach 40 to the beginning of reach 34.

As disclosed in the above-noted Rabinow patent, resetting means can be provided for shifting the code wheels 116 on each auxiliary shaft 108 to a zero position prior to setting of the code wheels according to the particular receiver into which the contents of the associated pocket 42 is to be discharged. This resetting means could be located between pairs of sprocket wheels 30 and 22 or just past the pair of sprocket wheels 22, but, in any case, prior to shifting of the code wheels to a newly coded setting.

An apparatus according to the instant invention is capable of comparatively more rapid operation due, in part, to the arrangement whereby one pocket immediately follows the next preceding one rather than there being a substantial space between certain of the pockets and rather than the coding means being located between as opposed to laterally of the pockets. This is reflected by an increased capacity of the apparatus as manifested by an increase in the number of articles capable of being handled per unit time as well as per unit speed of conveying. For a given speed of conveying, the number of articles which the apparatus is capable of handling per unit time is increased due, in part, to the relative compactness thereof thereby providing for a greater number of pockets per unit length of the conveyor. Because the apparatus of the present invention includes a plurality of conveyor reaches along which articles can be selectively discharged and is continuous and regular in operation, among other reasons, a comparatively greater number of pocket-discharge locations can be provided.

It will be noted that each individual pair of opposing members 60, 62 can readily be removed from the rest of the conveyor merely by pressing the plates 64 thereof toward each other, and lifting or lowering the respective opposing members out from between the main shafts 48 on which they are mounted. Obviously, installation or replacement of a pair of opposing members 60, 62 is accomplished by reversing these steps and their order.

Since many changes could be made in the embodiment of the invention as particularly described and shown herein without departing from the scope of the invention, it is intended that this embodiment be considered as exemplary and that the invention not be limited except as warranted by the following claims.

What is claimed is:

1. In combination: a conveyor including a plurality of pockets successively arranged therealong; each of said pockets comprising a pair of opposing members; yieldable over-center means carried for movement with each of said pairs of opposing members for alternatively urging the members of each pair to one of two pivotal positions of stability relative to each other; each pair of opposing members being closed adjacent its lower end and open adjacent its upper end when in one of said pivotal positions, and being open adjacent said lower end and closed adjacent said upper end when in the other of said pivotal positions; and said pockets being adapted to receive and carry articles when the members thereof are in said one position and being adapted to discharge said articles when the members thereof are moved to said other position.

2. In combination: a frame, a conveyor supported by said frame and including a plurality of pockets successively arranged therealong; each of said pockets comprising a pair of opposing members; means for alternatively urging the members of each pair to one of first and second pivotal positions of stability relative to each other; each pair of opposing members being closed adjacent its lower end and open adjacent its upper end when in said first pivotal position and being open adjacent said lower end and closed adjacent said upper end when in said second pivotal position; said pockets, when said members are in said first position, being adapted to receive and carry articles to be conveyed; means carried by said frame at a first location and operatively associated for moving each pair of opposing members in said second position to said first position preparatory to said pockets receiving and carrying said articles; and means carried by said frame and operatively associated for moving each of said pairs of opposing members from said second position to said first position to discharge said articles at a location past said first location.

3. In combination: a frame, a conveyor supported by said frame and including a plurality of pockets successively arranged therealong; each of said pockets comprising a pair of opposing members; means for alternatively urging the members of each pair to one of first and second pivotal positions of stability relative to each other; each pair of opposing members being closed adjacent its lower end and open adjacent its upper end when in said first pivotal position, and being open adjacent said lower end and closed adjacent said upper end when in said second pivotal position; said conveyor carrying a cam-follower for each of said pairs of opposing members and operatively connected for selectively moving the latter from each of said positions to the other; first cam means carried by said frame at a first location and cooperable with each of said cam-followers for moving each pair of opposing members in said second position to said first position preparatory to said pockets receiving and carrying articles to be conveyed; and second cam means arranged along said frame and cooperable at a plurality of locations with said cam-followers for moving said pairs of opposing members from said second position to said first position selectively to discharge said articles at respective ones of said plurality of locations.

4. In combination: an endless linkage carrying a plurality of successive pockets; said linkage being trained about guiding means therefor to provide a plurality of successive horizontal reaches and for inverting each succeeding pocket along with the portion of the linkage at which that pocket is carried while passing from one horizontal reach to the next; each of said pockets comprising a pair of opposing members alternatively disposed in one of two pivotal positions of stability relative to each other; each pair of opposing members along said horizontal reaches being closed adjacent its lower end and open adjacent its upper end when in one of said pivotal positions and being open adjacent said lower end and closed adjacent said upper end when in the other of said pivotal positions; each of said pockets being adapted to be loaded while the opposing members thereof are closed adjacent their lower ends; and means for moving the opposing members of each of the loaded pockets from its respective pivotal position to the other and for retaining the contents therein while passing from at least one of said horizontal reaches to a succeeding reach.

5. In combination: an endless linkage carrying a plurality of successive pockets; said linkage being trained about guiding means therefor to provide a plurality of successive horizontal reaches and for inverting each succeeding pocket along with the portion of the linkage at which that pocket is carried while passing from one horizontal reach to the next; each of said pockets comprising a pair of opposing members alternatively disposed in one of two pivotal positions of stability relative to each other; each pair of opposing members along said horizontal reaches being closed adjacent its lower end and open adjacent its upper end when in one of said pivotal positions and being open adjacent said lower end and closed adjacent said upper end when in the other of said pivotal positions; each of said pockets being adapted to be loaded while the opposing members thereof are closed adjacent their lower ends; means for moving the opposing members of each of the loaded pockets from its respective pivotal position to the other and for retaining the contents therein while passing from at least one of said horizontal reaches to a succeeding reach; and means along at least one of said reaches and operatively associated with said pairs of opposing members for moving the latter, when loaded, from said one position to said other position for discharging the contents thereof.

6. In combination: a conveyor including a plurality of pockets successively arranged therealong; each of said pockets comprising a pair of opposing members; each of said opposing members comprising a plurality of laterally spaced elements alternated laterally with and laterally spaced from those of the other opposing member of each pair; means for alternatively urging the members of each pair to one of two pivotal positions of stability relative to each other; the elements of the members of each of said pairs being spaced away from each other adjacent their upper ends and intersecting a laterally extending line adjacent their lower ends when the members of that pair are in one of said pivotal positions thereby to receive and carry an article; and the elements of the members of each of said pairs being spaced away from each other adjacent their lower ends when moved to the other of said pivotal positions thereby to discharge the respective article.

7. In combination: an endless conveyor including a plurality of pockets successively arranged therealong; said conveyor being trained about a plurality of rotary guiding means therefor to provide a plurality of successive horizontal reaches and for inverting each succeeding pocket along with the portion of the conveyor at which that pocket is carried while passing from one horizontal reach to the next; each of said pockets comprising a pair of opposing members; each of said opposing members comprising a plurality of laterally spaced elements alternated laterally with and laterally spaced from those of the other opposing member of each pair; means for alternatively urging the members of each pair to one of two pivotal positions of stability relative to each other; the elements of the members of each of said pairs along said horizontal reaches being spaced away from each other adjacent their upper ends and intersecting a laterally extending line adjacent their lower ends when the members of that pair are in one of said pivotal positions thereby to receive and carry an article to be conveyed; and the elements of the members of each of said pairs along said horizontal reaches intersecting a laterally extending line adjacent their upper ends and being spaced away from each other adjacent their lower ends when moved to the other of said pivotal positions thereby to discharge the respective article; means adjacent at least one of said rotary guiding means and operatively associated to move each of said pairs of members in said first position to said second position as the pairs of members move therepast; and means effective when the opposing members of each of said pairs are spaced away from each other adjacent their lower ends as each of said pairs of members is being inverted by said last-mentioned rotary guiding means for retaining a respective article therein.

8. The combination as set forth in claim 7 wherein said last-named means comprises a plurality of retaining members extending into the lateral space between respective elements of the opposing members of each of said pairs as the latter move therepast; each of said retaining members presenting a surface engageable with the articles carried by said opposing members when said last-named means is effective.

9. In combination: a pair of linkage members laterally spaced from each other and trained about guiding means therefor; a plurality of transverse, successively arranged shafts supported by said linkage members; a plurality of pairs of opposed members mounted for pivotal movement on said shafts to provide a succession of pockets; each of said pockets being open at its upper end and closed at its lower end in a first pivotal position of the respective pair of opposed members and being closed at its upper end and open at its lower end in a second pivotal position thereof; each of said pockets, when said members thereof are in said pivotal position, being adapted to receive and carry an article to be conveyed and, when said members thereof are pivoted to said second position, being adapted to discharge said article.

10. The combination as set forth in claim 9 wherein one member of each of said pairs is mounted on one of said shafts and the other member thereof is mounted on the next succeeding shaft whereby receipt and discharge of a respective article thereby is unobstructed by said one and said next shafts.

11. In combination: a frame; a conveyor mounted on said frame; said conveyor comprising a linkage trained about guiding means therefor; a plurality of successive transverse shafts supported by said linkage; a plurality of pairs of opposed members mounted for pivotal movement on said shafts to provide a succession of pockets; each of said pockets being open at its upper end and closed at its lower end in a first pivotal position of the respective pair of opposed members and being closed at its upper end and open at its lower end in a second pivotal position thereof; said pockets, when said members are in said first pivotal position, being adapted to receive and carry articles to be conveyed; and means arranged along said frame and operatively associated for moving said pairs of opposing members from said second position to said first position selectively to discharge said articles at respective ones of a plurality of locations.

12. The combination as set forth in claim 11 and including means carried by said frame at a location preceding said plurality of locations and operatively associated for moving each pair of opposing members in said second position to said first position preparatory to said pockets receiving and carrying said articles.

13. In combination: a conveyor comprising a pair of linkage members laterally spaced from each other and trained about guiding means therefor; a plurality of successive, transverse shafts supported by said linkage members; a plurality of pairs of opposing members; one member of each of said pairs being mounted for pivotal movement on one of said shafts and the other member thereof being mounted for pivotal movement on the next succeeding shaft; and yieldable over-center means alternatively urging the opposing members of each pair to one of first and second pivotal positions of stability; each of said pairs of opposing members being adapted to receive and carry an article when in said first pivotal position and being adapted to discharge said article when moved to said second pivotal position.

14. In combination: a conveyor comprising a pair of linkage members laterally spaced from each other and trained about guiding means therefor; a plurality of successive, transverse shafts supported by said linkage members; a plurality of pairs of opposing members; one member of each of said pairs being mounted for pivotal movement on one of said shafts and the other member thereof being mounted for pivotal movement on the next succeeding shaft; yieldable means urging the opposing members of each pair against the shaft on which it is mounted and alternatively urging the opposing members of each pair in opposite directions to one of first and second pivotal positions of stability; and the stop means limiting the extent of pivotal movement of the opposing members of each pair in said opposite directions; each of said pairs of opposing members being adapted to receive and carry an article when in said first pivotal position and being adapted to discharge said article when moved to said second pivotal position.

15. In combination: a frame supporting a conveyor; said conveyor comprising a pair of linkage members laterally spaced from each other and trained about guiding means therefor; a plurality of successive, transverse shafts supported by said linkage members; a plurality of pairs of opposing members; one member of each of said pairs being mounted for pivotal movement on one of said shafts and the other member thereof being mounted for pivotal movement on the next succeeding shaft; yieldable over-center means alternatively urging the opposing members of each pair to one of a first and second pivotal position of stability; each of said pairs of opposing members being adapted to receive and carry an article when in said first pivotal position and being adapted to discharge said article when moved to said second pivotal position; cam means carried by said frame; and a cam-follower carried by each of said shafts; each of said cam-followers being cooperable with said cam means and operatively connected to move a pair of said opposing members from said first position to said second position.

16. In combination: a conveyor including a plurality of pockets successively arranged therealong; each of said pockets comprising a pair of opposing members; means for alternatively urging the members of each pair to one of two pivotal positions of stability relative to each other; each pair of opposing members being closed adjacent its lower end and open adjacent its upper end when in one of said pivotal positions, and being open adjacent said lower end and closed adjacent said upper end when in the other of said pivotal positions; a cam providing a cam surface; a cam follower operatively connected for moving each pair of opposing members from one of said two positions to the other while engaged with said cam surface; said cam follower being normally movable at a level spaced from said cam surface; and means operatively associated with said cam follower for setting the latter to a level for engagement with said cam surface.

References Cited in the file of this patent
UNITED STATES PATENTS 807,687    Schirmer  --------------- Dec. 19, 1905